United States Patent
Trent et al.

(10) Patent No.: US 8,757,204 B1
(45) Date of Patent: *Jun. 24, 2014

(54) RISER RECOIL VALVE

(71) Applicant: Drilling Technological Innovations, LLC, Houston, TX (US)

(72) Inventors: David Trent, Houston, TX (US); Vamshi Gundameedi, Houston, TX (US)

(73) Assignee: Drilling Technological Innovations, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/088,307

(22) Filed: Nov. 22, 2013

(51) Int. Cl.
*F16K 11/085* (2006.01)
*F16K 11/02* (2006.01)
*F16K 1/50* (2006.01)
*F16K 5/04* (2006.01)

(52) U.S. Cl.
USPC ............. 137/601.16; 137/625.32; 251/283; 251/288; 251/310; 251/361

(58) Field of Classification Search
USPC ............ 137/601.16, 601.14, 625.24, 625.47, 137/625.32; 251/310, 288, 292, 283, 361, 251/363
See application file for complete search history.

(56) References Cited

U.S. PATENT DOCUMENTS

| | | | |
|---|---|---|---|
| 2,319,347 A * | 5/1943 | Reed | 137/625.24 |
| 5,209,302 A | 5/1993 | Robichaux et al. | |
| 5,623,966 A * | 4/1997 | Rodger | 137/625.32 |
| 6,352,114 B1 | 3/2002 | Toalson et al. | |
| 6,710,327 B2 | 3/2004 | Arshad et al. | |
| 6,817,422 B2 | 11/2004 | Jordan | |
| 7,131,496 B2 | 11/2006 | Williams et al. | |
| 7,588,393 B1 | 9/2009 | Shivers, III et al. | |
| 8,047,122 B1 | 11/2011 | Trent et al. | |
| 8,146,884 B2 * | 4/2012 | Yli-Koski et al. | 251/209 |
| 8,157,013 B1 | 4/2012 | Trent | |
| 2010/0047024 A1 | 2/2010 | Curtiss, III | |

* cited by examiner

*Primary Examiner* — Atif Chaudry
(74) *Attorney, Agent, or Firm* — Buskop Law Group, PC; Wendy Buskop (57) ABSTRACT

A riser recoil valve for use with a tensioning system of a drilling rig to control a riser recoil event with a choke spool housing with a hydraulic tank fluid port, a spool retainer port, an actuator opening with a rotation limiting keyway and a choke spool disposed within the choke spool housing. An actuator system with a cover, electrical and directional connections is connected and retains the choke spool housing which is further retained within the choke spool housing by a retaining spool which has an orifice for hydraulic fluid. The choke spool is connected to the choke spool housing by bearing surfaces on the choke spool and the choke spool housing. The choke spool is comprised of an outer spool and a rotatable inner spool, both containing a plurality of bidirectional flow holes. The rotatable inner spool has a shaft which contains pressure neutralization holes.

11 Claims, 8 Drawing Sheets

*FIGURE 8A*

RISER RECOIL VALVE

FIELD

The present embodiments generally relate to a riser recoil valve usable with tensioning systems for drilling rigs, particularly offshore drilling rigs.

BACKGROUND

A need exists for a low horse power riser recoil valve, which is safer than other types of currently available valves.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it in embodiments, is practiced or carried out in various ways.

The present embodiments generally relate to a riser recoil valve usable with tensioning systems for drilling rigs, particularly offshore drilling rigs.

A benefit of the riser recoil valve is that it prevents a riser recoil event that can save lives or serious bodily harm and dismemberment caused by cylinder expulsion resulting in an ejected cylinder landing on personnel.

A benefit of the riser recoil valve is that it prevents the destruction of rigs caused by a cylinder expulsion resulting in an ejected cylinder landing on a critical part of a rig causing an explosion.

A benefit of the riser recoil valve is that it prevents environmental damage caused by a rig explosion caused by an ejected tensioner cylinder.

A benefit of the riser recoil valve is it reduces fossil fuel consumption by providing more efficient motors and replacing inefficient motors ordinarily utilized in similar riser recoil valves as the actuator needed requires significantly less horsepower.

A benefit of the riser recoil valve is the valve has less moving parts resulting in a significantly lower risk of failure of the riser recoil valve system, thereby saving companies millions of dollars in part replacement and down time.

With fewer moving parts, the risk of valve failure is reduced and a longer life is achieved. With a longer life, the need for and the expense of additional repair and replacement materials are significantly reduced as the valve can remain in place for a longer life cycle.

A benefit of the riser recoil valve is that this invention provides a faster response time than currently available valves, allowing for use in deeper wells, as compared to other, costlier options to achieve the same well depths.

Further, the faster response time allows the valve to be usable in greater tension load.

The term "rotation limiting keyway" as used herein can refer to a slotted groove on the body which in embodiments, can be triangular in shape and can accept a second keyway from the actuator coupling into the rotation limiting keyway of the valve body to maintain rotational limits.

Figure 1:
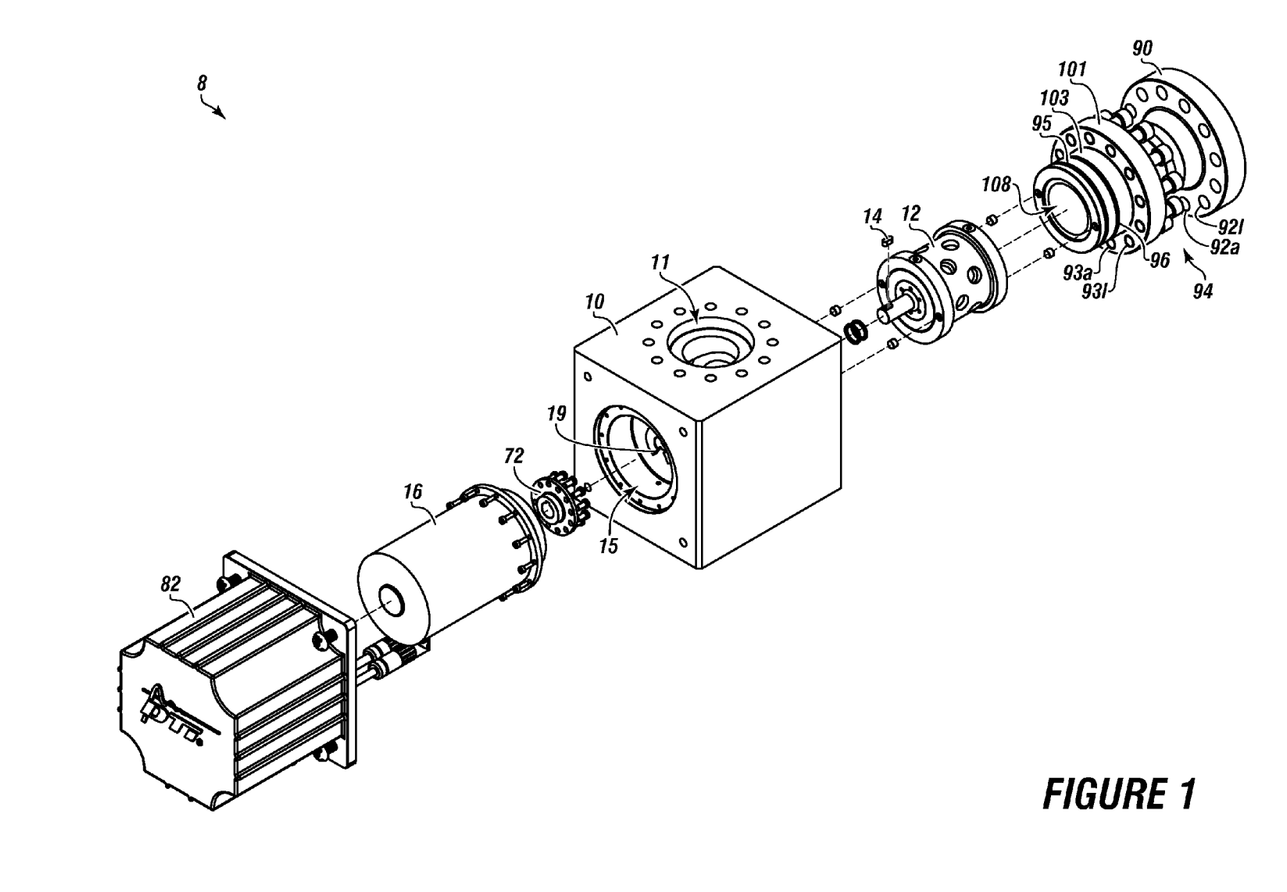
FIG. 1 is an exploded view riser recoil valve for use with a tensioning system of a drilling rig.

Now turning to the Figures, FIG. 1 is an exploded view of a riser recoil valve for use with a tensioning system of a drilling rig.

The riser recoil valve 8 can include a choke spool housing 10 with a tank fluid port 11 and a spool retainer port.

The choke spool housing can be made from steel, a non-oxidizing metal, or a powder coated metal. The choke spool housing can be square or another shape that covers the inner and outer spool and actuator system within the choke spool housing. The choke spool housing can be from 6 inches to 24 inches in height, and from 6 inches to 24 inches in width.

The choke spool housing can include an actuator opening 15 with a rotation limiting keyway 19.

The actuator opening can fit an actuator coupling 72 for engaging an actuator system 16 that can rotate the rotatable inner spool within the outer spool to control fluid flow by aligning and misaligning fluid flow holes in both spools.

The riser recoil valve can include an actuator system 16 that can operate at a low horsepower, such as from 2 horsepower to 500 horsepower. In embodiments, the actuator system 16 can include a motor, an encoder, and a brake.

The riser recoil valve can include choke spool 12 that can connect to the actuator system with the actuator coupling, allowing hydraulic fluid to flow bidirectionally into and out of the choke spool housing as a rotatable inner spool rotates within an outer spool of the choke spool. The choke spool 12 can throttle a tensioner on a drilling rig to control a riser recoil event.

The riser recoil valve can include a protective cover 82 that can cover the actuator system 16 and connect to the choke spool housing. The protective cover 82 can be formed over the actuator system 16 and extends from the choke spool housing.

The protective cover can be made from aluminum and attached to the choke spool housing 10 with fasteners, such as screws having safety engagements which prevent untrained and unauthorized personnel from removing the protective cover from the actuator. This component thwarts terrorists from damaging the tensioner system.

A retaining spool 94 can be connected to the choke spool housing 10 opposite the actuator system 16. The retaining spool 94 can have two flanges, a tapered locking flange 90 and flange 101.

In embodiments, the flanges can be spaced apart from each other a distance equivalent to a gap between a tensioning cylinder and a tank for holding hydraulic fluid.

The retaining spool 94 can have an annulus to convey hydraulic fluid.

The retaining spool 94 can have an orifice 108 for bi-directionally flowing hydraulic fluid to and from the annulus to the offshore tensioner system and to and from a tank connected to the riser recoil valve.

The tapered locking flange 90 can have flange fastening holes 92*a*-92*l* for connecting the flange to the tensioner system of the drilling rig. Fasteners can engage through each of the flange fastening holes.

The flange 101 can secure the retaining spool 94 to the choke spool housing 10 using a plurality of retaining spool fastening holes 93*a*-93*l*, each hole accommodating one of a plurality of fasteners. In embodiments, the fasteners can be nuts and bolts.

In embodiments, the retaining spool can be made from a non-oxidizing metal, such as steel, adapted to support high pressures of at least 6000 psi.

The flange 101 can have a seal body 103 having a primary seal 95 and a backup seal 96.

In embodiments, the primary seal and the backup seal can be elastomeric O-rings. Each O-ring can provide a fluid right seal.

The flange 101 can be spaced apart relationship from the tapered locking flange 90 at least 3 inches.

Also shown is a rotation limiting device 14, which can be a small rod of steel for engaging the coupling means on the actuator coupling.

Figure 2:
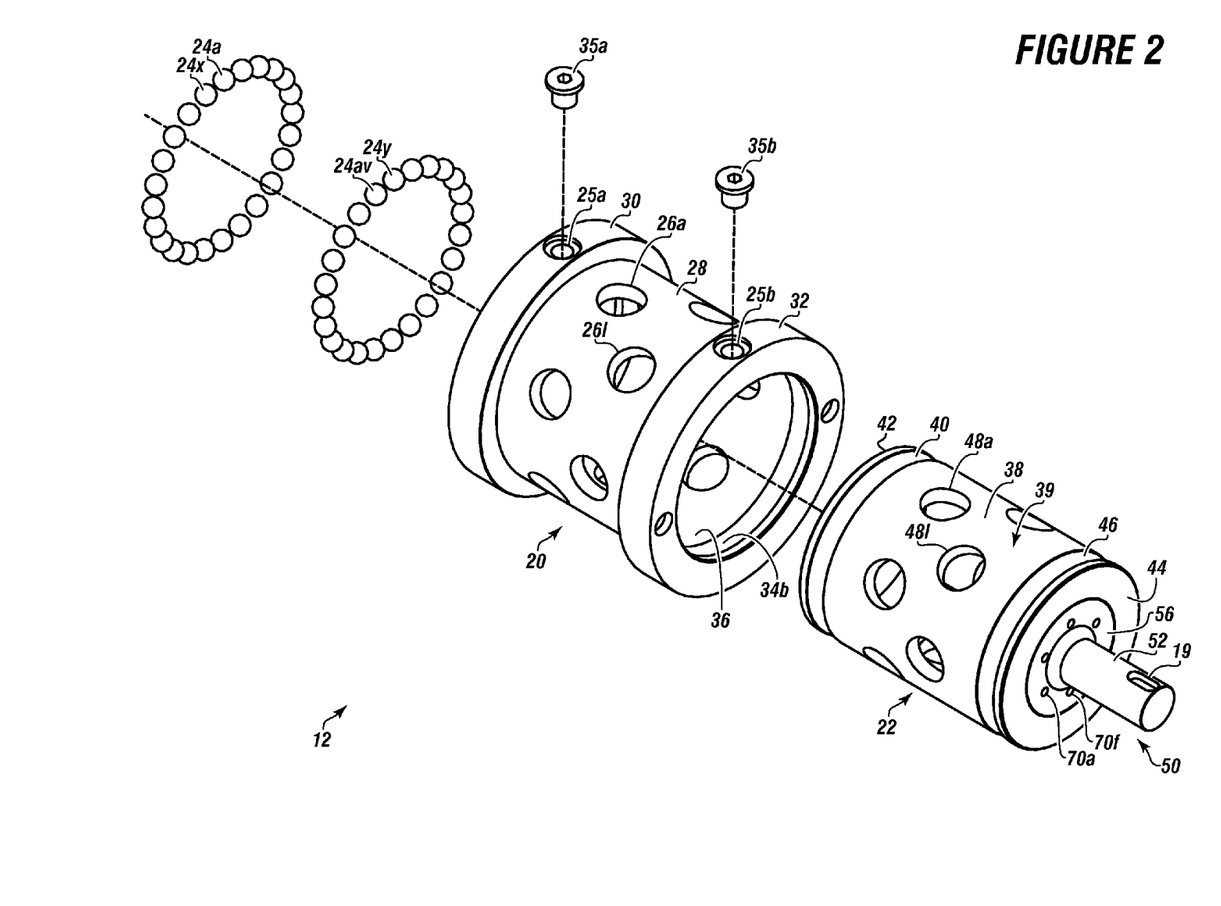
FIG. 2 depicts an exploded view of a choke spool.

FIG. 2 depicts an exploded view of a choke spool 12 used in the riser recoil valve.

The choke spool 12 can have an outer spool 20, rotatable inner spool 22, and a shaft 50.

The outer spool 20 can have an outer spool tubular body 28 with a first outer alignment shoulder 30 connected on one end of the outer spool tubular body 28.

A second outer alignment shoulder 32 on the outer spool tubular body 28 can be connected on an opposite end.

The outer spool tubular body 28 can have an inner diameter ranging from 2 inches to 16 inches for flowing hydraulic fluid to and from a tensioner system.

The outer pool tubular body 28 can be made from stainless steel or other high strength steel or non-oxidizing metal capable of sustaining pressures of at least 6000 psi.

The outer spool tubular body 28 can have an inner surface 36 with an inner diameter. Formed on the inner surface 36 can be a plurality of bearing grooves 34*b*.

A first bearing groove can be formed on the inner surface 36 at one end of the outer spool tubular body and a second bearing groove 34*b* can be formed on the inner surface of the outer spool tubular body opposite the first bearing groove.

In embodiments, the first and second bearing grooves can each be as wide as 0.25 inches to 1.5 inches.

In embodiments, each bearing groove can have a depth that is equivalent to at least 50 percent of a diameter of a non-oxidizing ball bearing 24*a*-24*av* contained in the bearing grooves.

In embodiments, first and second bearing grooves can each have a width that is at least 100 percent of the diameter of the non-oxidizing ball bearings.

A pair of bearing holes 25*a* and 25*b* are shown. Each bearing hole can be secured with a bearing pin 35*a* and 35*b*.

A plurality of outer spool bidirectional flow holes 26*a*-26*l* can be formed through the outer spool tubular body 28.

A rotatable inner spool 22 can be rotatably installed within the outer spool 20.

A very small gap, from 1 inch to 0.05 inches, can exist between the rotatable inner spool 22 and the outer spool 20.

The rotatable inner spool can have a rotatable inner spool tubular body 38 having an annulus.

The rotatable inner spool tubular body 38 can have a rotatable inner spool outer surface 39.

The rotatable inner spool tubular body 38 can have a first end bearing groove 40 formed on a first end 42 of the rotatable inner spool outer surface and a second end bearing groove 46 formed on a second end 44 of the rotatable inner spool outer surface.

The rotatable inner spool tubular body can have a plurality of rotatable inner spool bidirectional flow holes 48*a*-48*l* which can move in and out of alignment with the plurality of outer spool bidirectional flow holes 26*a*.

In an embodiment, the rotatable inner spool tubular body can have at least the same number of bidirectional flow holes as the outer spool bidirectional flow holes.

In embodiments, the diameters of the plurality of rotatable inner spool bidirectional flow holes can be identical to the plurality of the outer spool bidirectional flow holes.

The shaft 50 can mate into the inner surfaces of the annulus of the rotatable inner spool 22.

The shaft, in embodiments, can be a solid material, such as stainless steel. In embodiments, the shaft can be hollow.

The shaft 50 can have a handle 52 with a handle diameter. The handle 52 can have a coupling means, such as a rotation limiting keyway 19, for accommodating a motion limiting key.

The shaft 50 can have a shaft body 56 with a shaft body diameter larger than the handle diameter.

In embodiments, the shaft can have a diameter that is 20 percent to 50 percent less than the overall diameter of the rotatable inner spool.

O-rings can be used to seal any formed gap between the shaft and the inner surfaces of the rotatable inner spell.

A plurality of pressure neutralization holes 70*a*-70*f* can be formed in shaft body 56 of the shaft 50 for balancing fluid pressure into and out of the choke spool housing.

The fluid can flow from the inner diameter of the rotatable inner spool and out of the pressure neutralization holes.

A plurality of non-oxidizing ball bearings can be are installed between the first end bearing groove of the rotatable inner spool and the first bearing groove of the outer spool.

A second plurality of non-oxidizing ball bearings can be installed between the second end bearing grooves of the rotatable inner spool and the second bearing end groove of the outer spool.

Figure 3A:
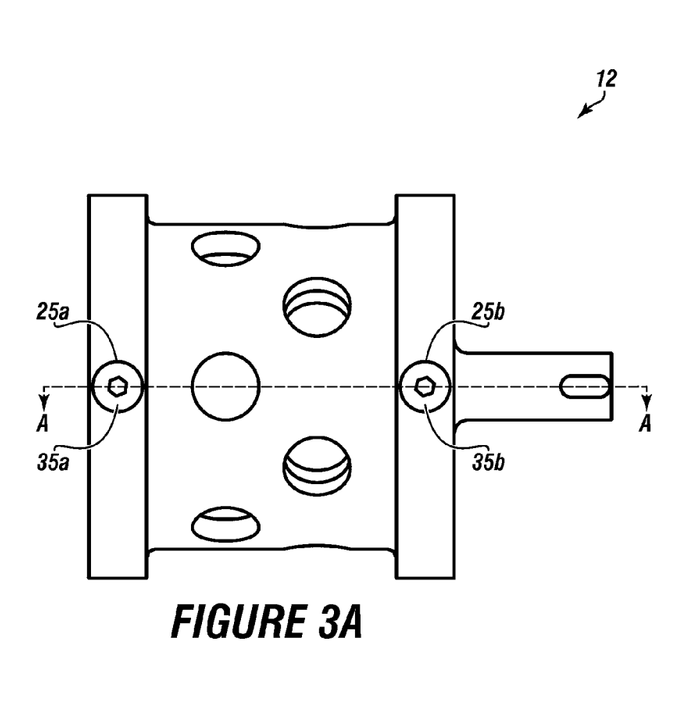
FIG. 3A depicts a side view of the choke spool.

FIG. 3A depicts a side view of the choke spool.

The choke spool 12 can include bearing holes 25*a* and 25*b* formed on opposite sides of the outer spool through the bearing grooves. Bearing pins 35*a* and 35*b* can engage the bearing holes.

Figure 3B:
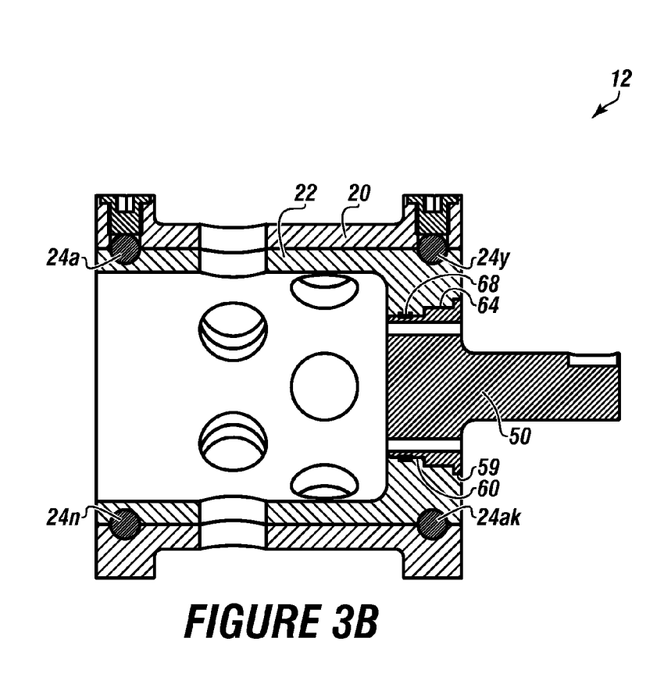
FIG. 3B depicts a cross sectional view of the choke spool with the rotatable inner spool inserted within the outer spool.

FIG. 3B depicts a cross section of the choke spool.

The choke spool 12 can include the rotatable inner spool 22 inserted into the outer spool 20.

Non-oxidizing ball bearings 24*a*, 24*n*, 24*y* and 24*ak* are shown.

The choke spool can include a shaft 50 with a lip stop 59, an alignment shoulder 64, a clip ring shoulder 60, and a removable clip ring 68 installed in a clip ring groove adjacent the clip ring shoulder.

Figure 4A:
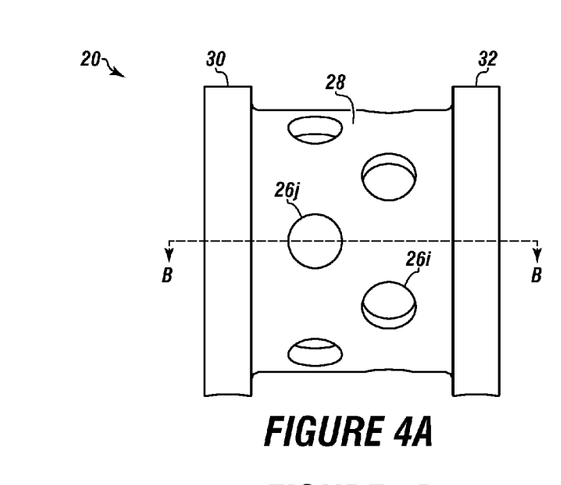
FIG. 4A depicts a side view of an outer spool.

FIG. 4A depicts a side view of an outer spool.

The outer spool 20 can include an outer spool tubular body 28, which can include a first outer alignment shoulder 30 connected on one end of the outer spool tubular body and a second outer alignment shoulder 32 connected on an opposite end of the outer spool tubular body.

A plurality of outer spool bidirectional flow holes 26j and 26i can be formed through the outer spool tubular body 28.

Figure 4B:
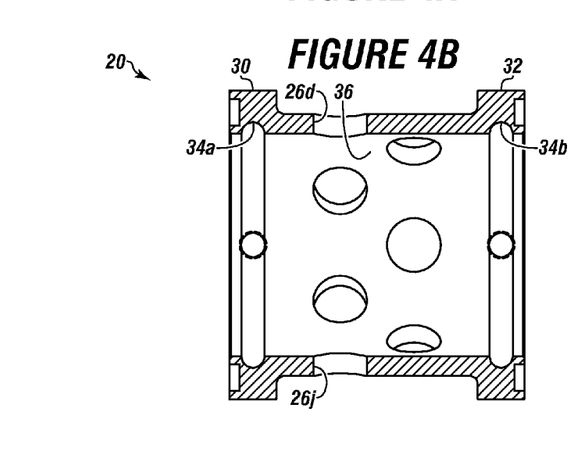
FIG. 4B depicts a cross sectional view of the outer spool.

FIG. 4B depicts a cross sectional view of the outer spool 20.

The outer spool tubular body is shown with the first outer alignment shoulder 30 connected on one end of the outer spool tubular body and a second outer alignment shoulder 32 connected on an opposite end of the outer spool tubular body.

A first bearing groove 34a is shown formed on the inner surface 36 at one end of the outer spool tubular body and the second bearing groove 34b formed on the inner surface of the outer spool tubular body opposite the first bearing groove.

Two of the plurality of outer spool bidirectional flow holes 26d and 26j are shown formed through the outer spool tubular body.

Figure 5A:
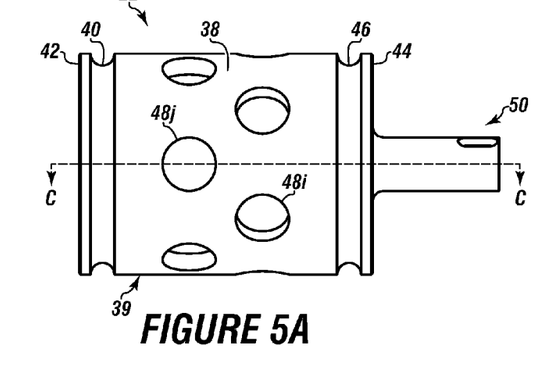
FIG. 5A depicts a side view of a rotatable inner spool.

FIG. 5A depicts a side view of a rotatable inner spool.

The rotatable inner spool 22 can have a rotatable inner spool tubular body 38 with a rotatable inner spool outer surface 39.

A first end bearing groove 40 can be formed on a first end 42 of the rotatable inner spool outer surface 38.

A second end bearing groove 46 can be formed on a second end 44 of the rotatable inner spool outer surface 38 on the side that engages the shaft 50.

Two of the plurality of rotatable inner spool bidirectional flow holes 48i and 48j are shown. The rotatable inner spool bidirectional flow holes can move in and out of alignment with the plurality of outer spool bidirectional flow holes when the rotatable inner spool tubular body is rotated within the outer spool housing.

Figure 5B:
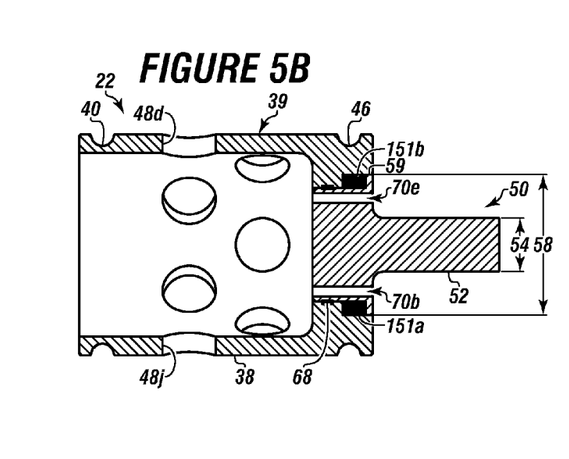
FIG. 5B depicts a cross sectional view of a rotatable inner spool.

FIG. 5B depicts a cross sectional view of a rotatable inner spool with shaft.

The rotatable inner spool 22 can have a rotatable inner spool tubular body 38 with a rotatable inner spool outer surface 39. Rotatable inner spool bidirectional flow holes 48d and 48j can be included along with first end bearing groove 40 and second end bearing groove 46 formed in the outer surface 39.

The shaft 50 can have a handle 52 with a handle diameter 54.

The shaft 50 can have a lip stop 59.

A non-removable clip ring 68 is shown. The non-removable clip ring 68 can be installed on the clip ring groove to prevent rotation of the shaft.

A plurality of pressure neutralization holes 70b and 70e can be formed in the shaft 50 for balancing fluid pressure in the choke spool housing.

Anti-rotation pins 151a and 151b can engage anti-rotation grooves in the shaft.

Figure 6:
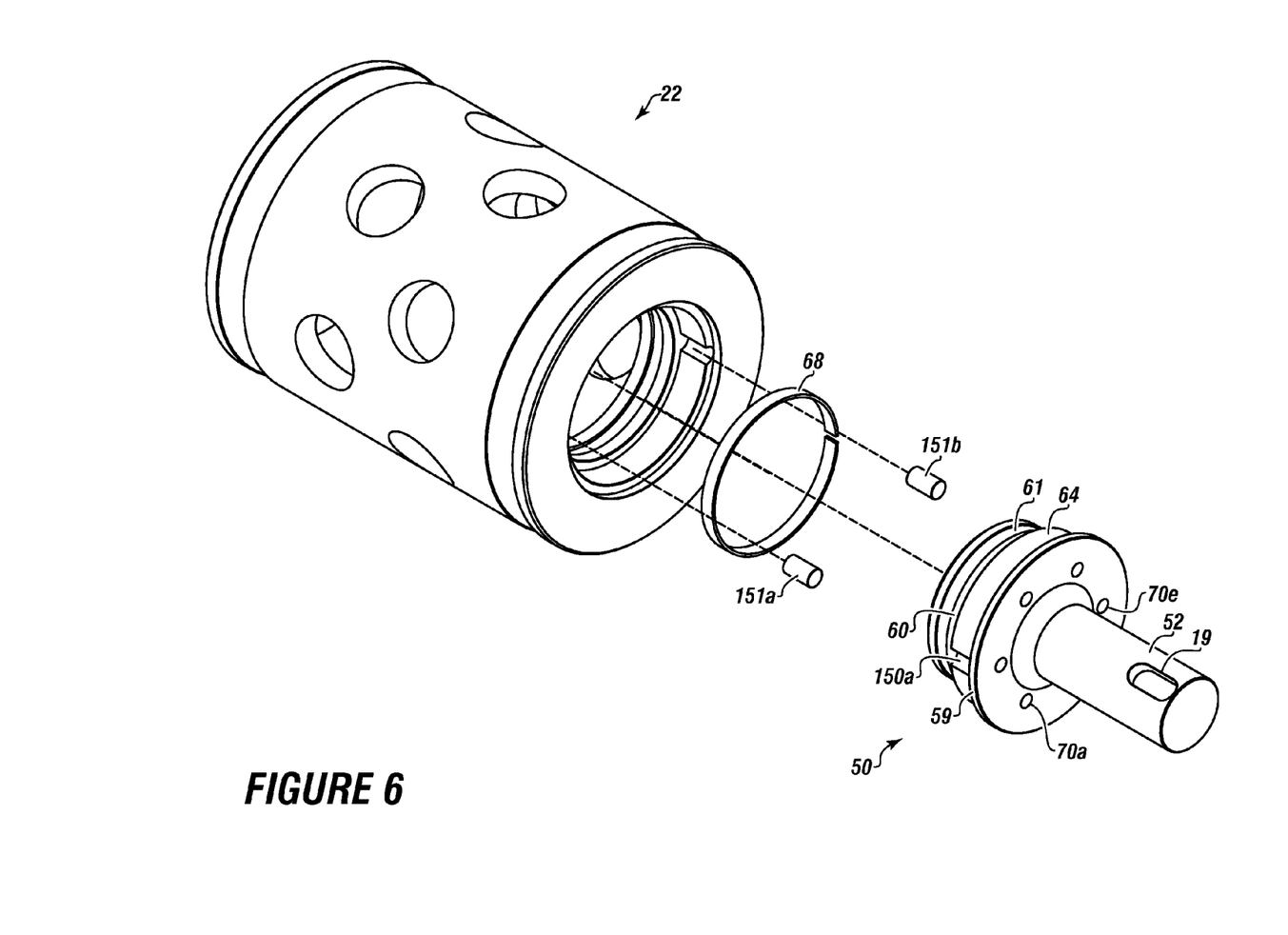
FIG. 6 depicts an exploded view of a rotatable inner spool and shaft.

FIG. 6 shows an exploded version of the rotatable inner spool 22 with a non-removable clip ring 68 mountable to an inside surface of the shaft 50.

Anti-rotation pins 151a and 151b can engage anti-rotation grooves in the inner side of the rotatable inner spool.

Also shown on the shaft are a lip stop 59; an alignment shoulder 64 with a diameter less than a diameter of the lip stop 59; clip ring shoulder 60 formed adjacent the alignment shoulder with a diameter less than the diameter of the alignment shoulder; and clip ring groove 61 formed adjacent a clip ring shoulder 60.

In embodiments, the non-removable clip ring 68 can be installed in the clip ring groove to seal the shaft to the rotatable inner spool.

The shaft can have a plurality of pressure neutralization holes 70a-70e formed in the shaft 50 for balancing fluid pressure into and out of the choke spool housing 10.

The handle 52 is also shown with rotation limiting keyway 19.

Figure 7A:
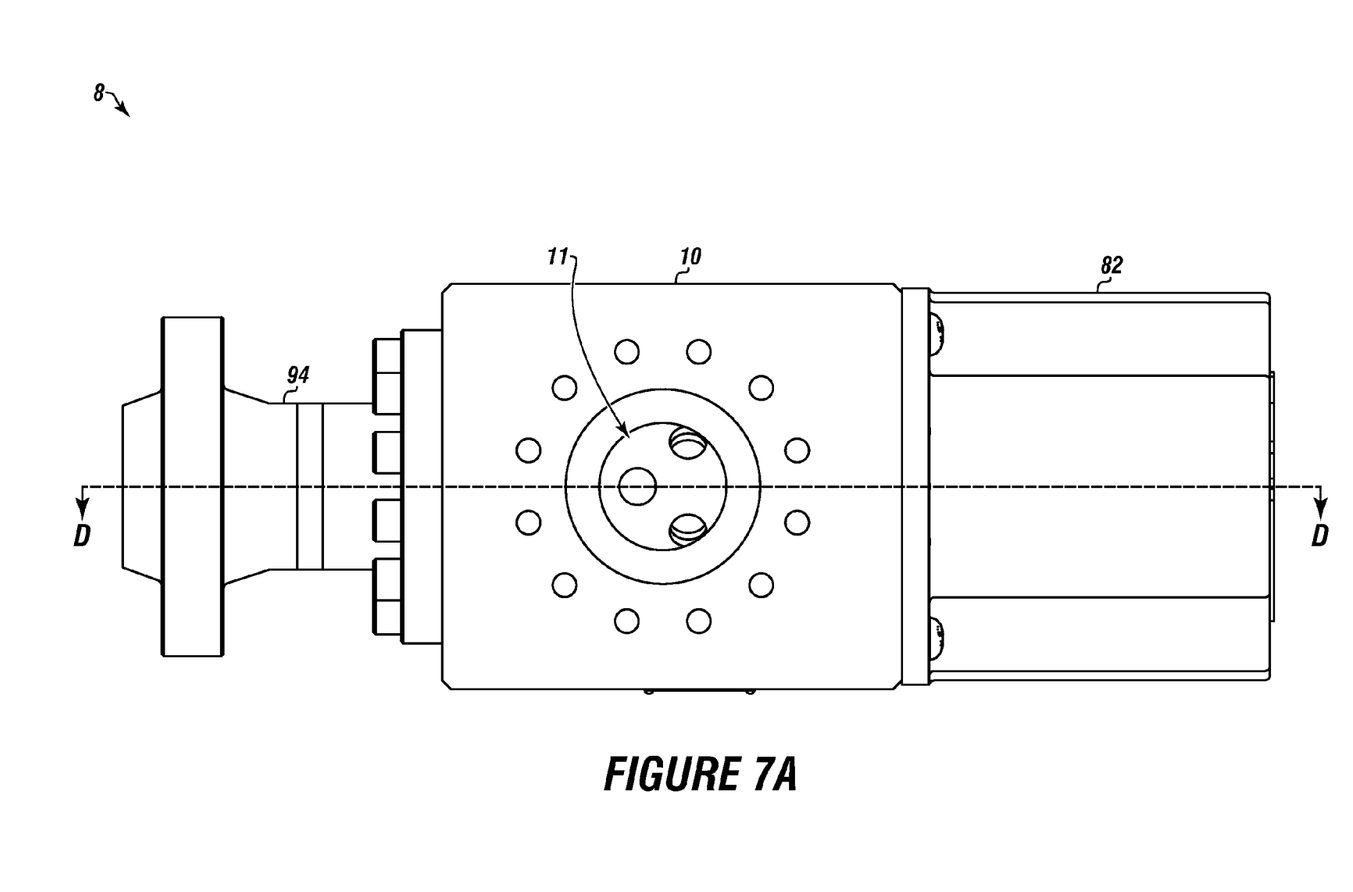
FIG. 7A depicts a top view of an assembled riser recoil valve.

FIG. 7A depicts a view of an assembled riser recoil valve 8.

The choke spool housing 10 can have a protective cover 82 covering the actuator system and actuator connectors for signal and electrical communication to the drilling rig or the tensioner system or both.

A retaining spool 94 and tank fluid port 11 are also shown.

Figure 7B:
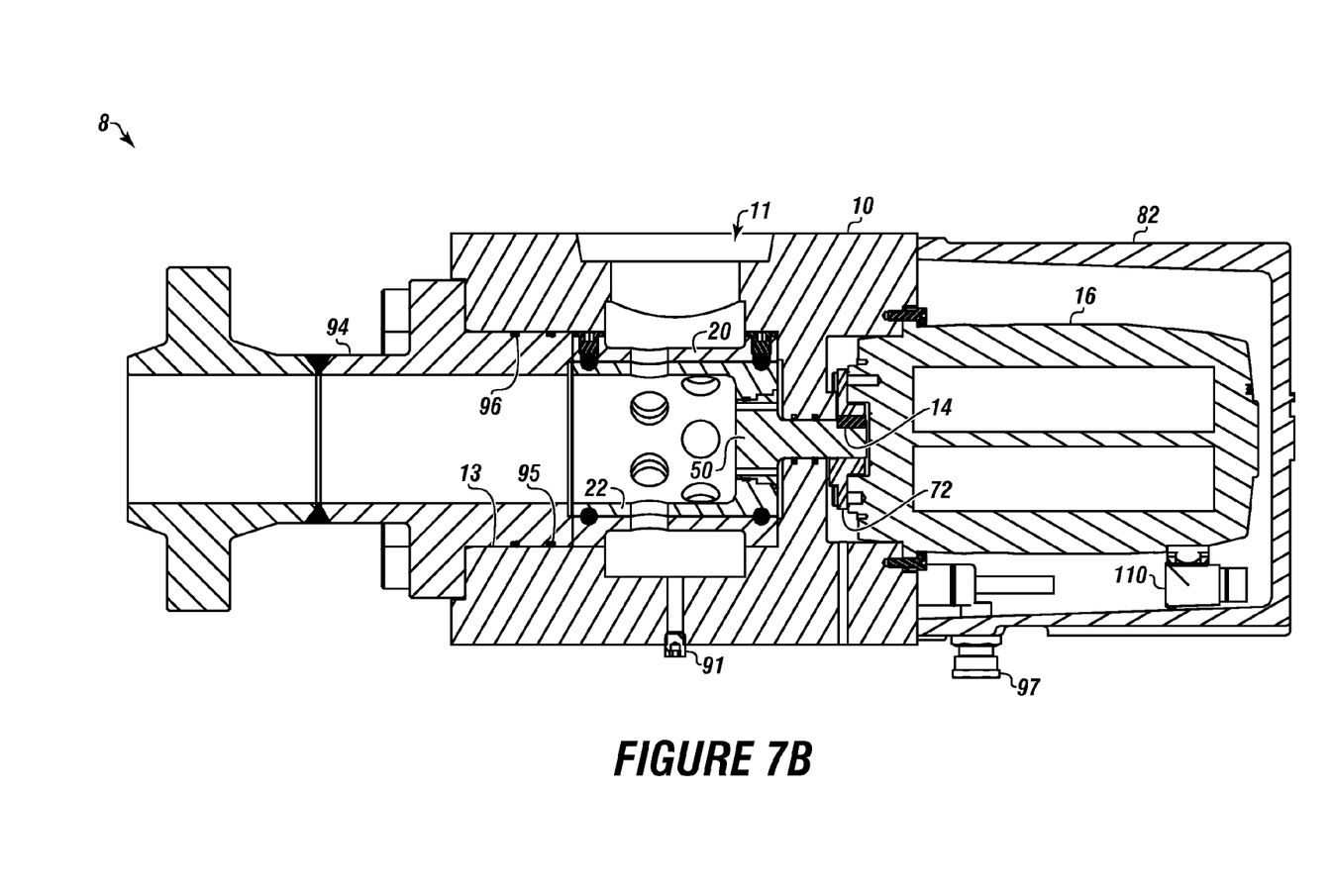
FIG. 7B shows a cross sectional view of the assembled riser recoil valve of FIG. 7A.

FIG. 7B shows a cross section of the assembled riser recoil valve of FIG. 7A.

The riser recoil valve 8 can include a choke spool housing 10 with a drain port 91, a cable port 97, a tank fluid port 11, and a spool retainer port 13.

The choke spool housing 10 can share both a primary seal 95 and a backup seal 96 with the retaining spool 94.

The choke spool housing can contain a portion of the actuator system 16 within the protective covering 82.

A rotation limiting device 14, actuator coupling 72 and outer spool 20 are shown.

The shaft 50 is shown with a rotatable inner spool 22.

A retaining spool 94 can connect to the choke spool housing.

Signal connectors 110 which can also conduct electivity to the tensioner system of the drilling rig can also be within the protective covering.

Figure 8A:
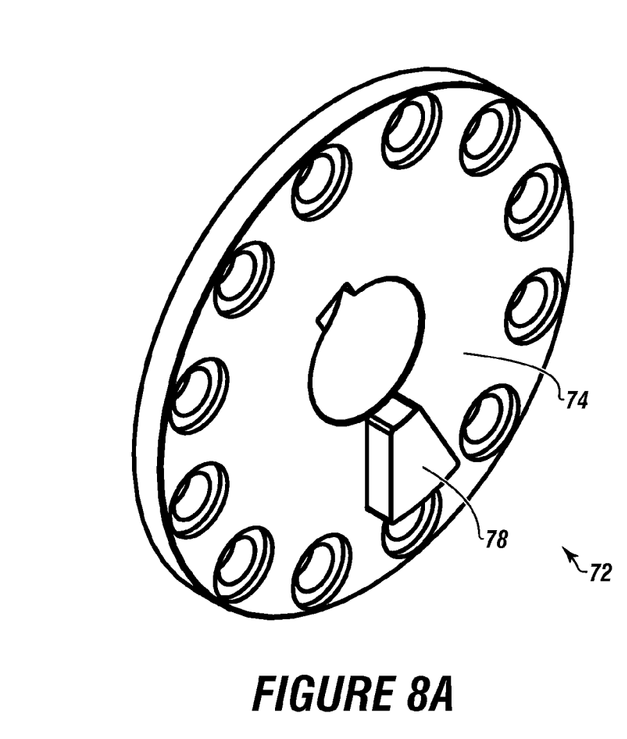
FIG. 8A depicts a front isometric view of an actuator coupling depicting a keyway and a rotation limiting key.

FIG. 8A depicts a coupling face 74 of an actuator coupling 72 with a rotation limiting key 78 mounted on the face.

Figure 8B:
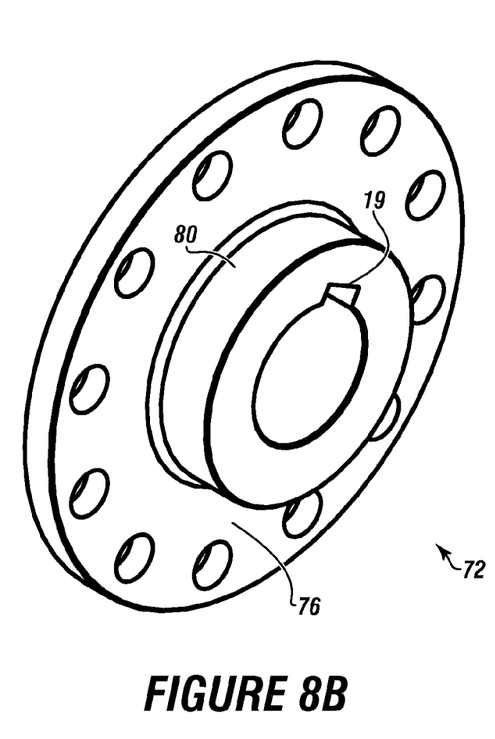
FIG. 8B depicts a back isometric view of an actuator coupling depicting a hub.

FIG. 8B depicts a coupling back 76 of an actuator coupling 72 with a shaft hub 80 extending from the back.

The shaft hub 80 can have a rotation limiting keyway 19 engaging the rotation limiting key and the shaft hub 80 can engage the choke spool housing 10.

In embodiments, the riser recoil valve can include an actuator system with a motor, an encoder, and a brake. The actuator system can produce a low horsepower, such as less than 500 horsepower.

In embodiments, the choke spool can be an integral one piece component.

In embodiments, from 2 to 200 outer spool bidirectional flow holes can be formed in the outer spool body and the rotatable inner spool body for controlled alignment of the flow holes to control fluid flow into and out of the tensioner system.

While these embodiments have been described with emphasis on the embodiments, it should be understood that within the scope of the appended claims, the embodiments might be practiced other than as specifically described herein.

What is claimed is:

1. A riser recoil valve for use with a tensioning system of a drilling rig comprising:
   a. a choke spool housing with a tank fluid port, a spool retainer port, and an actuator opening with a rotation limiting keyway;
   b. a choke spool disposed within the choke spool housing, the choke spool comprising:
      (i) an outer spool comprising:
         1. an outer spool tubular body;
         2. a first outer alignment shoulder connected on an end of the outer spool tubular body;
         3. a second outer alignment shoulder connected on an opposite end of the outer spool tubular body;
         4. an inner surface;
         5. a first bearing groove formed on the inner surface at the end of the outer spool tubular body and a second bearing groove formed on the inner surface of the outer spool tubular body opposite the first bearing groove; and 6. a plurality of outer spool bidirectional flow holes formed through the outer spool tubular body;

(ii) a rotatable inner spool for rotating within the outer spool comprising:
1. a rotatable inner spool tubular body having a rotatable inner spool outer surface;
2. a first end bearing groove formed on a first end of the rotatable inner spool outer surface;
3. a second end bearing groove formed on a second end of the rotatable inner spool outer surface; and
4. a plurality of rotatable inner spool bidirectional flow holes which move in and out of alignment with the plurality of outer spool bidirectional flow holes when the rotatable inner spool tubular body is rotated within the outer spool housing;

(iii) a shaft that mates into the rotatable inner spool comprising:
1. a handle with a handle diameter and a coupling means;
2. a shaft body with a shaft body diameter larger than the handle diameter;
3. a clip ring shoulder with a clip ring shoulder diameter formed on the shaft body opposite the handle; an
4. an alignment shoulder with an alignment shoulder diameter between the clip ring shoulder and the handle, wherein the alignment shoulder diameter is larger than the clip ring shoulder diameter;

(iv) a plurality of pressure neutralization holes formed in the shaft for balancing fluid pressure into and out of the choke spool housing; and (v) a plurality of non-oxidizing ball bearings installed between the first end bearing groove and the and second end bearing groove of the rotatable inner spool and the first bearing groove and the second bearing groove of the outer spool;

c. an actuator coupling with a face and a back, a rotation limiting key on the face, and a shaft hub extending from the back, wherein the rotation limiting key engages the rotation limiting keyway and the shaft hub engages the choke spool; and d. an actuator system engages the actuator coupling to operate at a horsepower from 2 horsepower to 500 horsepower, wherein the actuator system connects to the choke spool rotating the rotatable inner spool to open and close alignment of the plurality of rotatable inner spool bidirectional flow holes relative to the plurality of outer spool bidirectional flow holes allowing hydraulic fluid to flow bidirectionally into and out of the choke spool housing and the choke spool to throttle a tensioner on the drilling rig to control a riser recoil event.

2. The riser recoil valve of claim 1, wherein the choke spool is an integral one piece component.

3. The riser recoil valve of claim 1, wherein the shaft comprises:
a. a lip stop;
b. the alignment shoulder with the alignment shoulder diameter less than a diameter of the lip stop;
c. the clip ring shoulder formed adjacent the alignment shoulder with the clip ring shoulder diameter less than the alignment shoulder diameter;
d. a clip ring groove formed adjacent the clip ring shoulder; and
e. a non-removable clip ring installed in the clip ring groove to seal the shaft to the rotatable inner spool.

4. The riser recoil valve of claim 1, comprising a protective cover formed over the actuator system extending from the choke spool housing.

5. The riser recoil valve of claim 1, comprising a tapered locking flange connected to the choke spool opposite the actuator system providing a sealing engagement with the tensioner system of the drilling rig.

6. The riser recoil valve of claim 5, wherein a retaining spool comprises:
a. the tapered locking flange comprising a plurality of flange fastening holes;
b. a flange securing the tapered locking flange to the choke spool housing, the flange comprising:
(i) a plurality of retaining spool fastening holes;
(ii) a seal body comprising a primary seal and a backup seal; and
(iii) an orifice.

7. The riser recoil valve of claim 1, wherein from 2 to 200 outer spool bidirectional flow holes are formed in the outer spool body and the rotatable inner spool body for controlled alignment of the flow holes by the actuator system which controls fluid flow into and out of the tensioner system.

8. The riser recoil valve of claim 1, comprising a rotational keyway on the shaft for engaging a coupling means on the actuator coupling.

9. The riser recoil valve of claim 1, wherein the first bearing groove and the second bearing groove each having a depth at least 50 percent the diameter of the non-oxidizing ball bearings.

10. The riser recoil valve of claim 1, wherein the first bearing groove and the second bearing groove each having a width that is at least 100 percent of the diameter of the non-oxidizing ball bearing.

11. The riser recoil valve of claim 1, comprising anti-rotation pins which engage anti-rotation grooves, each formed on a side of the outer spool.

* * * * *